(12) United States Patent
Kato et al.

(10) Patent No.: US 6,799,630 B1
(45) Date of Patent: Oct. 5, 2004

(54) TUBE FOR HEAT EXCHANGERS AND METHOD OF MANUFACTURING THE SAME

(75) Inventors: Soichi Kato, Saitama (JP); Muneo Sakurada, Saitama (JP); Shin Kurihara, Saitama (JP); Sadao Haiya, Saitama (JP); Takashi Sugita, Saitama (JP); Shoji Akiyama, Saitama (JP); Takahumi Umehara, Saitama (JP)

(73) Assignee: Zexel Corporation, Tokyo (JP)

( * ) Notice: Subject to any disclaimer, the term of this patent is extended or adjusted under 35 U.S.C. 154(b) by 460 days.

(21) Appl. No.: 09/486,230
(22) PCT Filed: Sep. 14, 1998
(86) PCT No.: PCT/JP98/04141
§ 371 (c)(1),
(2), (4) Date: Feb. 24, 2000
(87) PCT Pub. No.: WO99/14544
PCT Pub. Date: Mar. 25, 1999

(30) Foreign Application Priority Data

Sep. 16, 1997 (JP) ............................................... 9-251159

(51) Int. Cl.⁷ .............................. F28F 1/00; B23P 15/26
(52) U.S. Cl. ............. 165/177; 29/890.053; 29/890.054; 165/170
(58) Field of Search ................................ 165/177, 183, 165/181, 170; 29/890.049, 890.046, 890.053, 890.054

(56) References Cited

U.S. PATENT DOCUMENTS

| | | | | |
|---|---|---|---|---|
| 1,177,320 A | * | 3/1916 | Grabawsky ............ | 29/890.053 |
| 3,750,709 A | * | 8/1973 | French ................... | 29/890.049 |
| 5,186,250 A | * | 2/1993 | Ouchi et al. ................ | 165/183 |
| 5,271,151 A | * | 12/1993 | Wallis .................... | 29/890.053 |
| 5,560,425 A | * | 10/1996 | Sugawara et al. .......... | 165/170 |
| 5,579,837 A | * | 12/1996 | Yu et al. ..................... | 165/183 |
| 5,697,433 A | * | 12/1997 | Kato .......................... | 165/170 |
| 5,799,397 A | * | 9/1998 | Yasuda et al. ......... | 29/890.053 |
| 5,826,646 A | * | 10/1998 | Bae et al. .................... | 165/183 |

FOREIGN PATENT DOCUMENTS

| | | | | |
|---|---|---|---|---|
| DE | 932335 | * | 8/1955 | ................. 165/170 |
| JP | 404086489 | * | 3/1992 | ................. 165/177 |
| JP | 405045082 | * | 2/1993 | ................. 165/183 |
| JP | 11-30493 | * | 2/1999 | |
| JP | 11-63872 | * | 3/1999 | |
| SE | 89432 | * | 6/1937 | ................. 165/170 |

* cited by examiner

*Primary Examiner*—Ljiljana Ciric
(74) *Attorney, Agent, or Firm*—Takeuchi & Takeuchi

(57) ABSTRACT

A tube for a heat exchanger which has beads (21) formed on a brazing sheet (B) for configuring a tube (2) and tops of the beads brazed with opposed portions within a tube part (20) and a method for manufacturing the tube. The tube part (20) prior to brazing is determined to have a thickness (t') larger than a predetermined thickness (t) and compressed in a direction of its thickness when it is brazed, and the tube which has tops of the beads crushed against or lodged in opposed portions within the tube part. Also a method for manufacturing the tube which can braze the tops of the beads with the opposed portions within the tube more securely and firmly than before.

1 Claim, 12 Drawing Sheets

TUBE FOR HEAT EXCHANGERS AND METHOD OF MANUFACTURING THE SAME

TECHNICAL FIELD

The present invention relates to a tube for a heat exchanger, which is produced by forming beads on a brazing sheet for composing the tube and brazing the tops of the beads with the opposing portions in a tube part.

BACKGROUND ART

A conventionally known heat exchanger is configured by connecting a plurality of tubes for exchanging the heat of a medium so to communicate with header pipes for distributing and collecting the medium.

The tube used for such a type of heat exchanger is produced by forming a brazing sheet into the shape of a tube and brazing required points of the tube. The brazing sheet is formed by rolling, pressing or the like.

The brazing sheet has the surface of a plate matrix clad with a brazing material. Brazing is generally carried out by assembling tubes, header pipes and other members into one body and thermally treating the assembly. In other words, the required parts of the tube and other required parts of the heat exchanger are brazed by a single operation of heat treatment.

And, this tube is provided at appropriate intervals with beads for dividing passages for a medium. Specifically, the beads are formed by bending the brazing sheet so to have recessed portions, and the tops of the beads are brazed with the opposed portions within the tube part in order to improve the pressure resistance and heat-exchanging property of the tube.

For example, FIG. 9 is a transverse sectional view showing an example of forming the brazing sheet. FIGS. 10 and 11 are transverse sectional views each showing the top of a bead formed on the brazing sheet and the opposed portion within the tube part.

A brazing sheet B is provided with a plurality of beads 31, 31 at appropriate intervals and joint sections 32, 32 at both ends of the brazing sheet in its breadth direction. The brazing sheet B is folded along a folding section 33 at the center in the breadth direction so to join the joint sections 32, 32 mutually (see FIG. 9).

The formed body of the brazing sheet B is integrally assembled with other members and thermally treated so to braze the joint sections 32, 32 mutually.

When the brazing sheet B is folded, each of the beads 31 has its top 31a contacted to an opposed portion within a tube part 30 (see FIG. 10). The top 31a of the bead 31 is brazed with the opposed portion within the tube part 30 when the joint sections 32, 32 are mutually brazed (see FIG. 11). FIGS. 10 and 11 show that a brazing material 36 melts from the surface of a matrix 35 of the brazing sheet B to enter a space between the top 31a of the bead 31 and the opposed portion within the tube.

Arrows t in FIGS. 10 and 11 indicate a predetermined thickness of the tube 3. In other words, the matrix 35 of the brazing sheet B is determined so to have a predetermined dimension when the brazing sheet B is folded.

In order to secure the aforesaid satisfactory pressure resistance and heat-exchanging property for the tube for a heat exchanger, it is necessary to securely and firmly braze the tops of the beads with the opposed portions within the tube part.

The brazing between the tops of the beads and the opposed portions within the tube part is quite delicate to securely have the brazing material between them. Therefore, there was often a problem that brazing was defective at some positions in the tube.

For example, even when the tops of the beads are brought into contact with the opposed portions within the tube part in the stage of forming the brazing sheet into the tube part, the brazing material melts from the surface of the matrix 35 of the brazing sheet while brazing, and a space s corresponding to a thickness of the brazing material layer is formed between the tops 31a of the beads 31 and the opposed portions within the tube part as shown in FIG. 12. The space s formed between both sections of the matrix 35 makes it difficult to secure the brazing material needed for brazing and causes the degradation of a brazing property.

In view of the problems described above, it is an object of the present invention to provide a tube for a heat exchanger, which can have tops of beads brazed securely and firmly with opposed portions within a tube part, and a method for manufacturing the same.

DISCLOSURE OF THE INVENTION

According to the invention there is provided a tube for a heat exchanger having beads formed on a brazing sheet for configuring the tube and the tops of the beads brazed with opposed portions within a tube part, wherein the tops of the beads are crushed against the opposed portions within the tube.

According to the tube for a heat exchanger of the present invention, the tops of the beads are crushed in the opposed portions within the tube part, so that the tops of the beads can be brazed securely and firmly with the opposed portions within the tube part by virtue of the brazed portions.

BEST MODE FOR CARRYING OUT THE INVENTION

Embodiments of the present invention will be described in detail with reference to the accompanying drawings.

Figure 1:
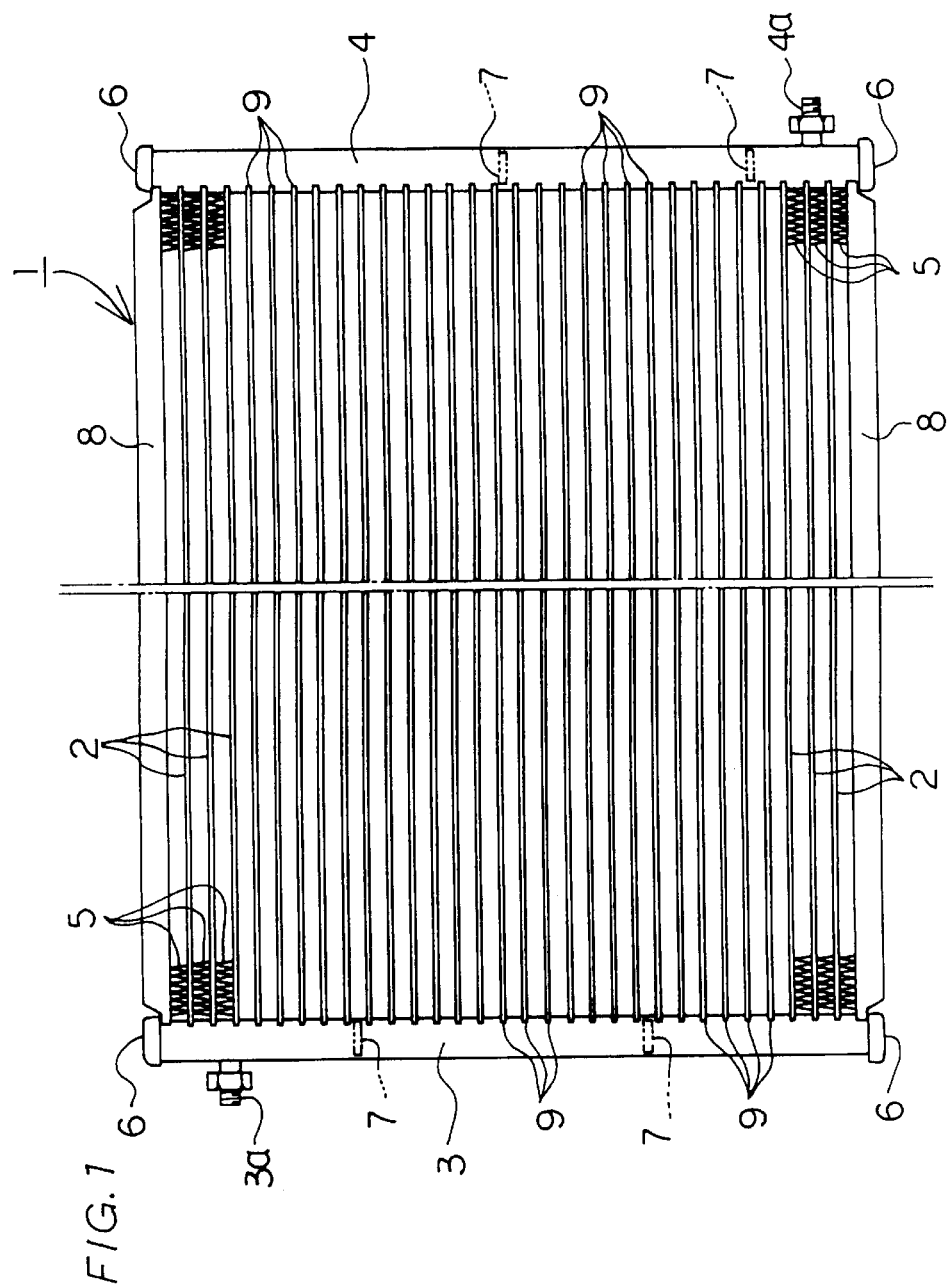
FIG. 1 is a front view showing a heat exchanger according to an embodiment of the invention.

FIG. 1 shows that a heat exchanger 1 of this embodiment has a plurality of tubes 2, 2, which are stacked with fins 5, 5 interposed between them, connected to communicate with header pipes 3, 4 which are disposed at both ends of the tubes 2, 2.

The header pipes 3, 4 are cylindrical and have their upper and lower end openings sealed with caps 6, 6 and their insides divided by partition plates 7, 7 disposed at predetermined positions. And, they are also provided with an inlet joint 3a for taking in a heat-exchanging medium and an outlet joint 4a for externally discharging the heat exchanging medium. Tube holes 9, 9 are formed at predetermined intervals on the respective header pipes 3, 4 in their longitudinal directions.

The tubes 2, 2 are designed to have an external size at each of their ends slightly smaller than the tube holes 9, 9. The respective ends are inserted into and brazed to the tube holes 9, 9.

A side plate 8 is disposed at the top and bottom of the layer of the tubes 2, 2. The side plate 8 has its both ends fixed to the respective header pipes 3, 4 to reinforce the structural strength of the heat exchanger.

By configuring as described above, the medium taken in through the inlet joint 3a is meandered a plurality of times to flow between the header pipes 3 and 4 in a predetermined group unit of tubes 2, flowed through the tubes 2 while exchanging heat and is discharged from the outlet joint 4a. The heat exchange by the medium is promoted by an effect of heat radiation by virtue of the fins 5 interposed between the tubes 2, 2 and between the side plates 8.

Figure 2:
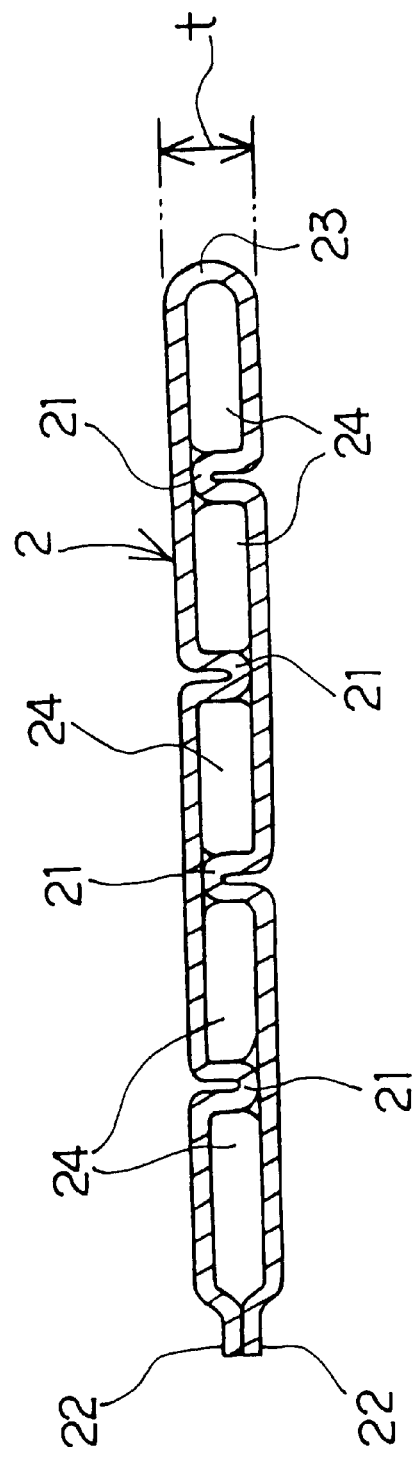
FIG. 2 is a transverse sectional view showing a tube according to the embodiment of the invention.
Figure 3:
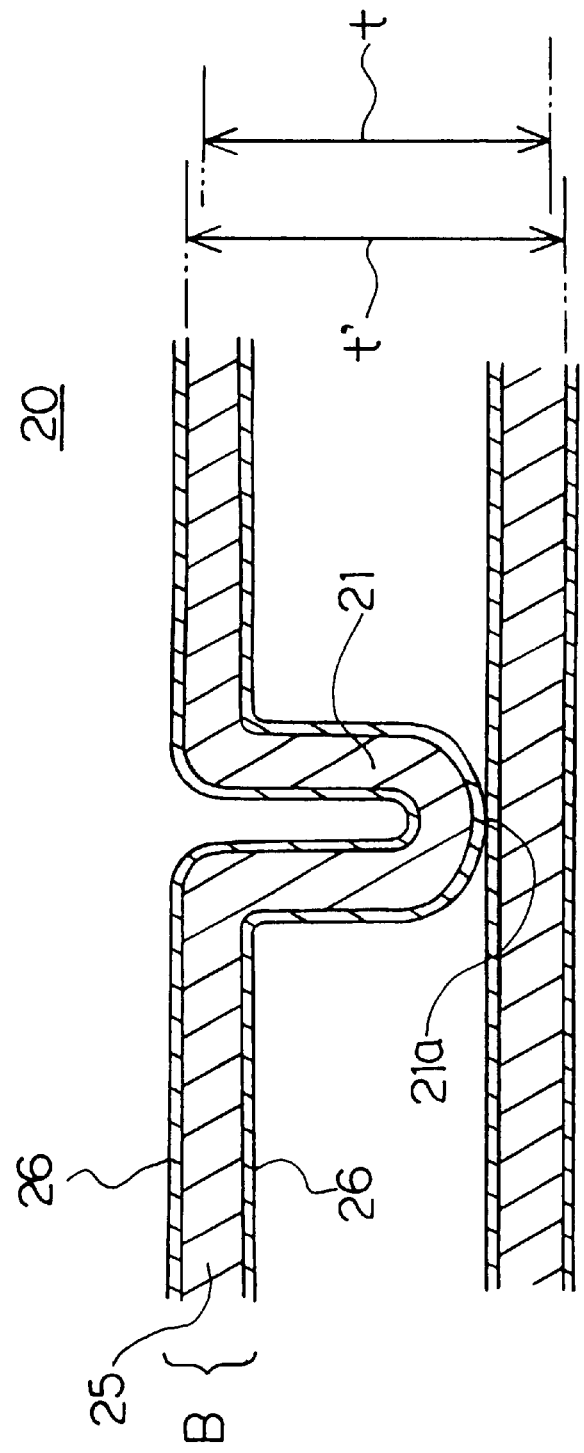
FIG. 3 is a transverse sectional view showing a required portion of a tube part prior to brazing according to the embodiment of the invention.
Figure 4:
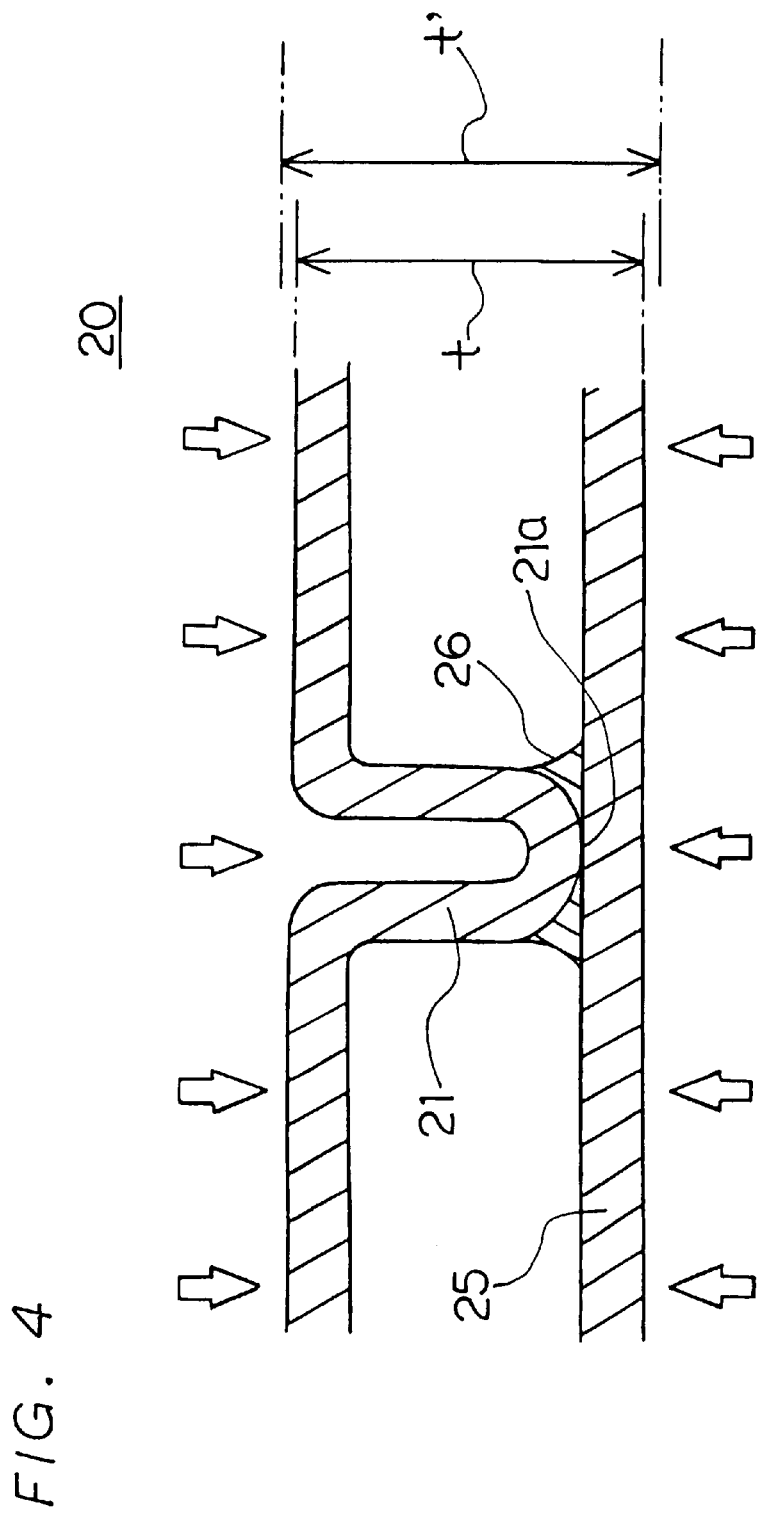
FIG. 4 is a transverse sectional view showing the required portion of the tube part after brazing according to the embodiment of the invention.

The tube 2 of this embodiment is formed by forming a brazing sheet B, which has the surface of a matrix 25 clad with a brazing material 26, and brazing it as shown in the transverse sectional views of FIG. 2 to FIG. 4.

Specifically, in order to form the tube 2, the brazing sheet B is bent in its longitudinal direction to form recessed portions so to form a plurality of beads 21, 21 and also joint sections 22, 22 at both ends of the brazing sheet B in its breadth direction. Then, the brazing sheet B is folded along a folding portion 23 at the center to contact the joint sections 22, 22 mutually and also tops 21a of the beads 21 with opposed portions within the tube so as to form a tube part 20. The joint sections 22, 22 of the tube part 20 as well as the tops 21a, 21a of the beads 21, 21 and the opposed portions within the tube part 20 are mutually brazed to configure the tube 2. Thus, a plurality of passages 24, 24 for the medium divided by the beads 21, 21 are formed within the tube 2.

And, in the process of manufacturing the tube 2, the tube 2 is determined to have a predetermined thickness t when the joint sections 22, 22 of the tube part 20 as well as the tops 21a, 21a of the beads 21, 21 and the opposed portions within the tube part 20 are mutually brazed. Specifically, the tube part 20 prior to brazing is determined to have a thickness t' larger (thicker) than the predetermined thickness t, and the tube part 20 being brazed is pressed in a direction of its thickness (directions indicated by white arrows in FIG. 4) to have the predetermined thickness t. In this embodiment, the tube 2 has the predetermined thickness t of 1.70 mm, and the tube part 20 prior to be brazed has the thickness t' of 1.74 mm. A depth (t'–t=0.04 mm) that the tube part 20 is pressed when it is brazed corresponds to the thickness of the brazing material 26 between the top 21a of the bead 21 and the opposed portion within the tube part. The thickness t' of the tube part 20 prior to brazing does not include the thickness of the brazing material layer 26 on the outer surface of the tube part 20.

And, a pressing force for compressing the tube part 20 at the time of brazing is obtained by elasticity of the fins 5, 5 interposed between the tubes 2, 2.

Specifically, brazing is performed after assembling the tube parts 20, 20, the fins 5, 5 and the header pipes 3, 4 into one body by means of a jig. When assembling them, the tube parts 20, 20 have the thickness t' larger than the predetermined thickness t, so that elasticity serving to compress the tube parts 20, 20 in a direction of their thickness is accumulated in the fins 5, 5. And, when the brazing material 26 melts from the surface of the matrix 25 by performing the heat treatment, both sections of the matrix 25 come to contact at the brazing portion between the top 21a of the bead 21 and the opposed portion within the tube part 20.

Thus, since the both sections of the matrix 25 are mutually contacted, the brazing material 26 flows along the surface of the matrix 25 and stays between the top 21a of the bead 21 and the opposed portion within the tube part 20. As a result, the brazing property between the top 21a of the bead 21 and the opposed portion within the tube part 20 is improved.

As described above, the method of manufacturing the tube for a heat exchanger of this embodiment compresses the tube in a direction of its thickness when brazing, so that the brazing material melts from the surface of the matrix of the brazing sheet to prevent formation of the space between the top of the bead and the opposed portion within the tube part. Consequently, the top of the bead and the opposed portion within the tube part can be brazed securely and firmly.

According to the method of manufacturing the tube for a heat exchanger of this embodiment, the thickness of the tube prior to brazing is determined to be larger than the predetermined thickness, so that the predetermined thickness can be obtained by compressing the tube part in a direction of its thickness when brazing.

Conventionally, the brazing material layers themselves were mutually contacted at the brazing portion. But, the tube for a heat exchanger of this embodiment has both sections of the matrix of the brazing sheet mutually contacted, so that the top of the bead and the opposed portion within the tube part can be brazed securely and firmly.

Figure 5:
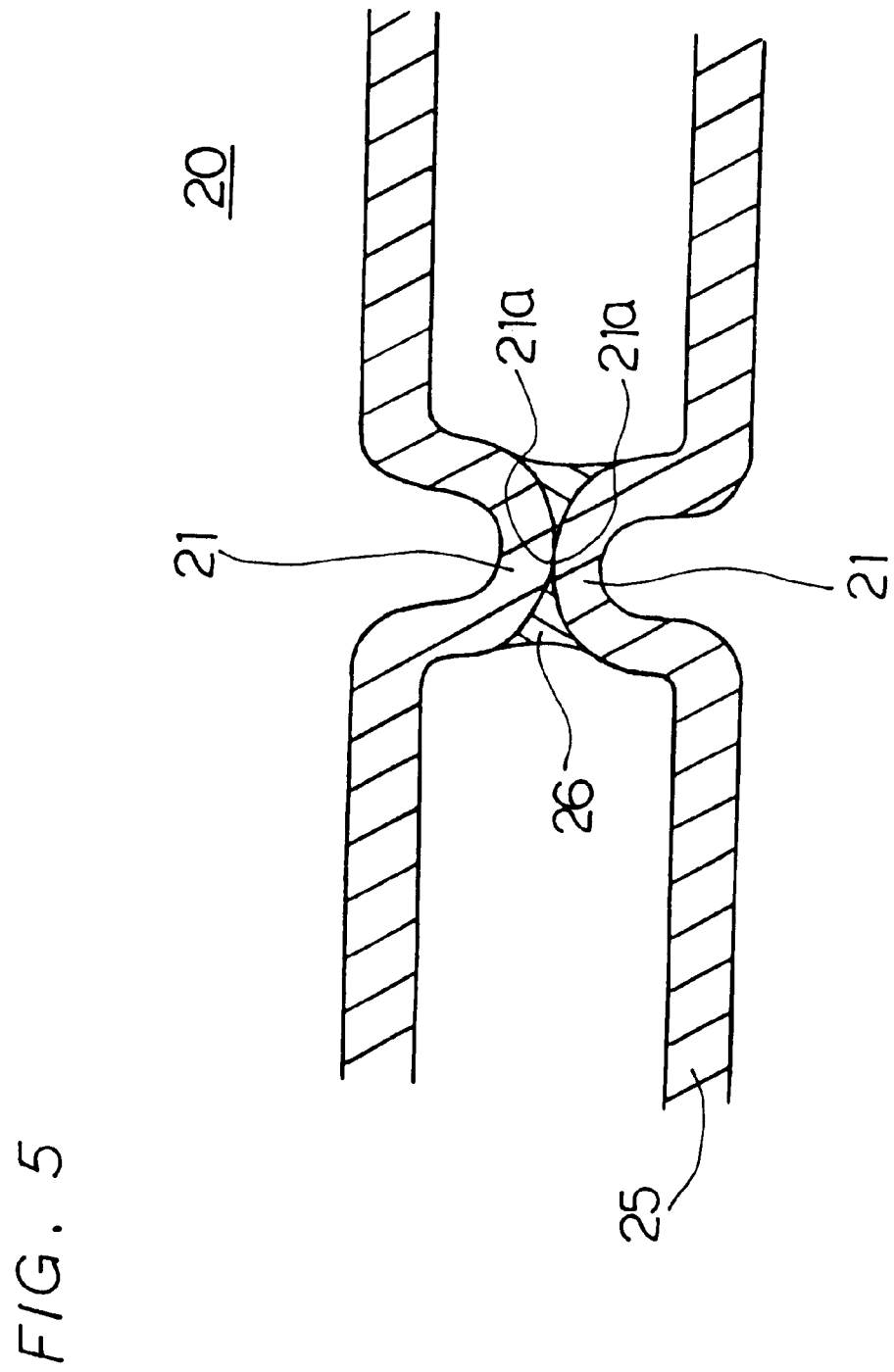
FIG. 5 is a transverse sectional view showing the required portion of the tube part after brazing according to the embodiment of the invention.

As shown in FIG. 5, on the portion opposed to the bead 21 may be formed with another bead 21 so that tops 21a, 21a of these beads 21, 21 are brazed mutually. The tube part in this case is also compressed in a direction of its thickness when brazing. And, both sections of the matrix 25 are brought into contact mutually at the brazing portions of the tops 21a, 21a of the beads 21, 21.

Another embodiment of the present invention will be described with reference to FIG. 6 through FIG. 8.

In this embodiment, a brazing area between the top of the bead 21 and the opposed portion within the tube part is increased so that the brazing is performed more securely and firmly. Other structure remains the same as in the aforesaid embodiment, and its description will be omitted.

Figure 6:
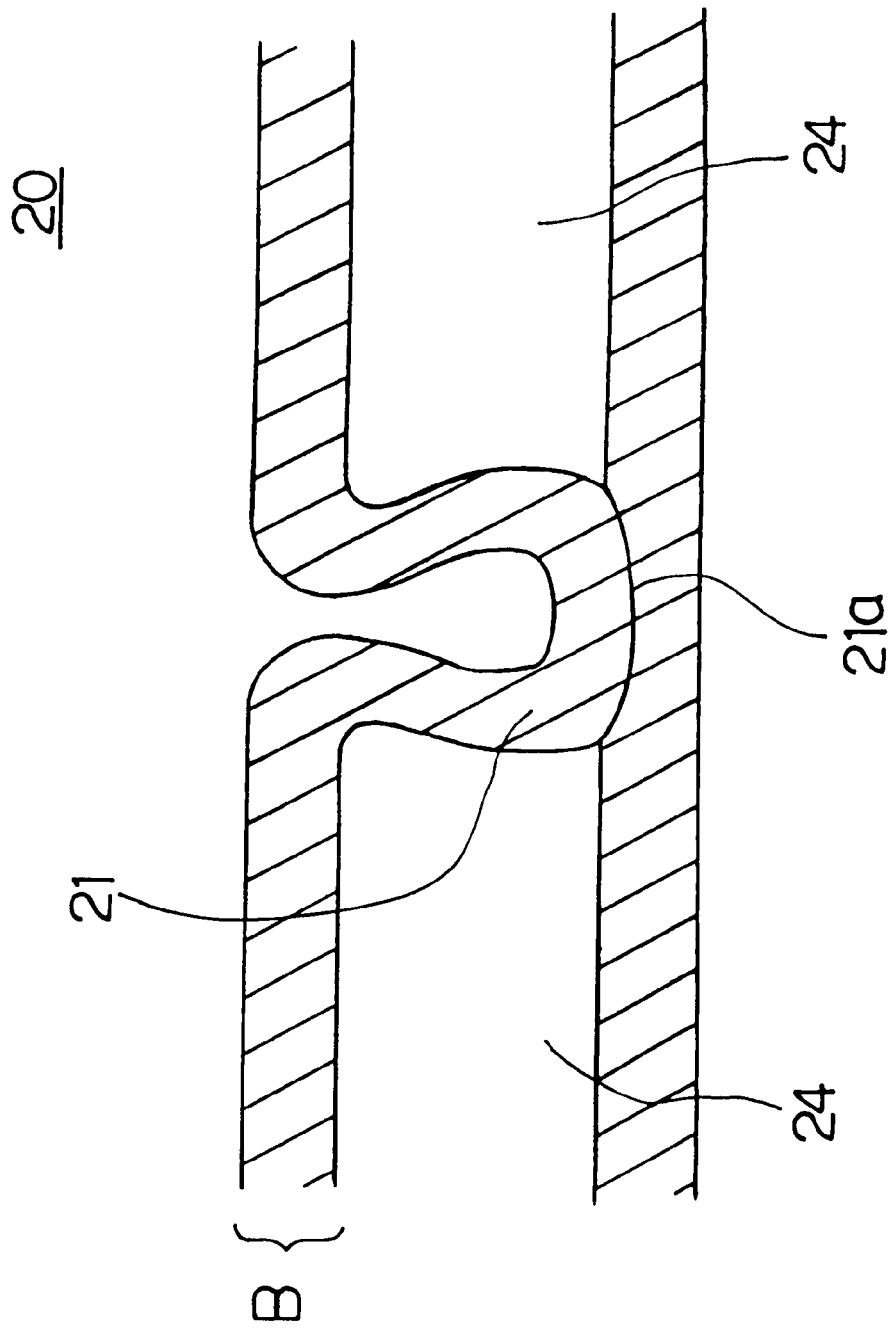
FIG. 6 is a transverse sectional view showing a required portion of a tube part prior to brazing according to an embodiment of the invention.

The bead 21 of this embodiment in a stage prior to brazing is formed to have the top 21a swelled as shown in FIG. 6.

Figure 7:
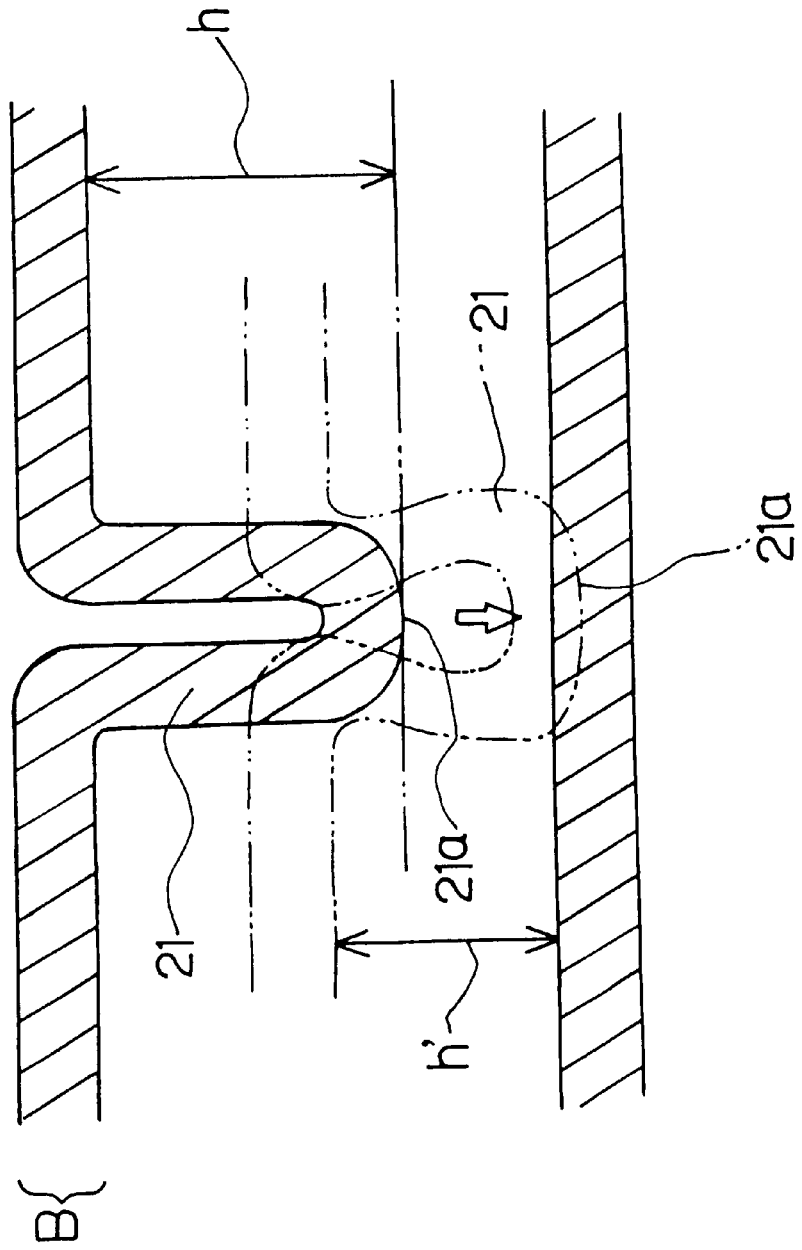
FIG. 7 is a transverse sectional view showing the required portion of the tube part when a brazing sheet is formed according to the embodiment of the invention.

Specifically, the bead 21 is formed to have a height h higher than a height h' which is enough to reach the opposed portion within the tube part 20 as shown in FIG. 7. The top 21a of the bead 21 is pushed (in a direction indicated by a white arrow in FIG. 7) against the opposed portion within the tube part 20 when the brazing sheet B is folded, and crushed against or lodged in the opposed portion within the tube part 20 as indicated by a chain line shown in the same drawing. Therefore, contact areas between the tops 21a, 21a of the beads 21, 21 and the opposed portions within the tube part 20 are increased, so that their brazing areas are increased when they are brazed.

As described above, according to the method for manufacturing the tube for a heat exchanger of this embodiment, since the tops of the beads are crushed against the opposed portions within the tube part, the brazing area (contact area) between the top of the bead and the opposed portion within the tube part can be increased, and they can be brazed securely and firmly.

According to the method for manufacturing the tube for a heat exchanger of this embodiment, the brazing area (contact area) between the top of the bead and the opposed portion within the tube part can be increased because the top of the bead is lodged in the opposed portion within the tube part, and they can be brazed securely and firmly.

And, the tube for a heat exchanger of this embodiment has the tops of the beads swelled, so that the brazing area (contact area) between the top of the bead and the opposed portion within the tube part can be increased, and they can be brazed securely and firmly.

Figure 8:
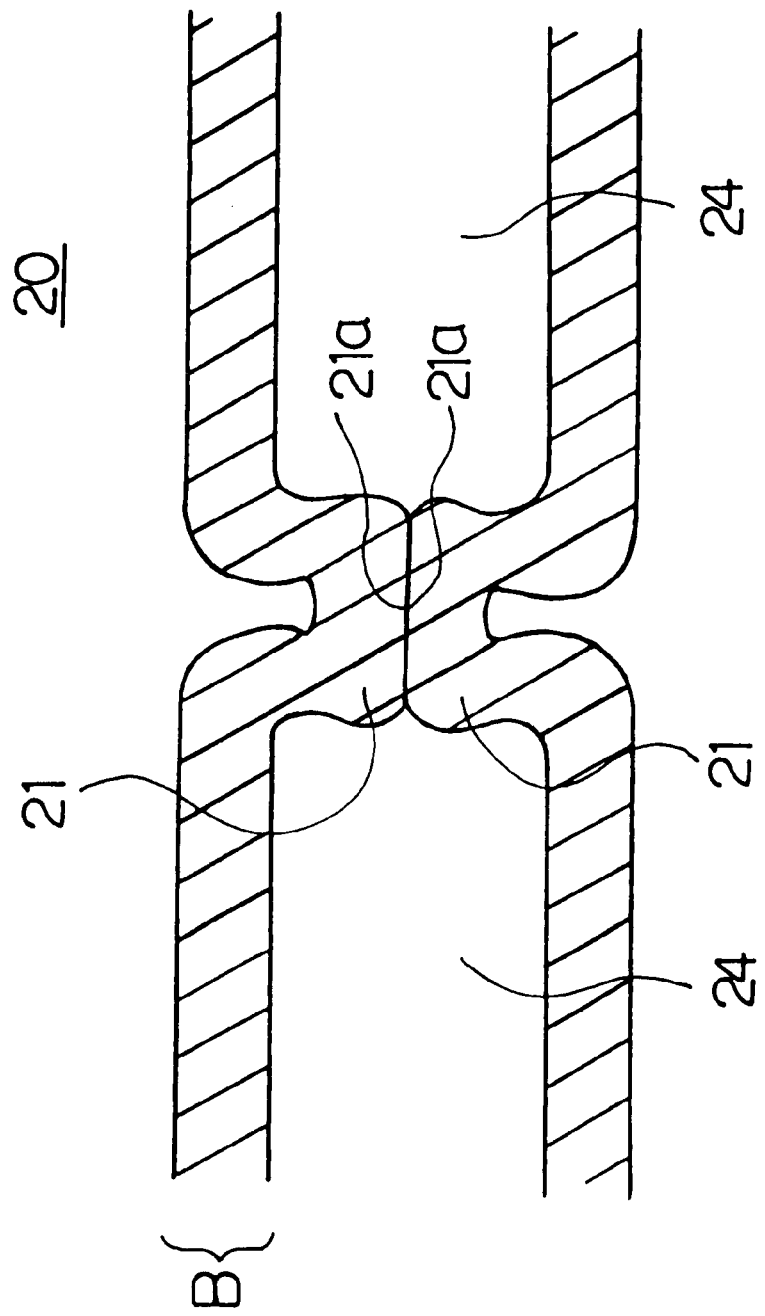
FIG. 8 is a transverse sectional view showing the required portion of the tube part prior to brazing according to the embodiment of the invention.
Figure 9:
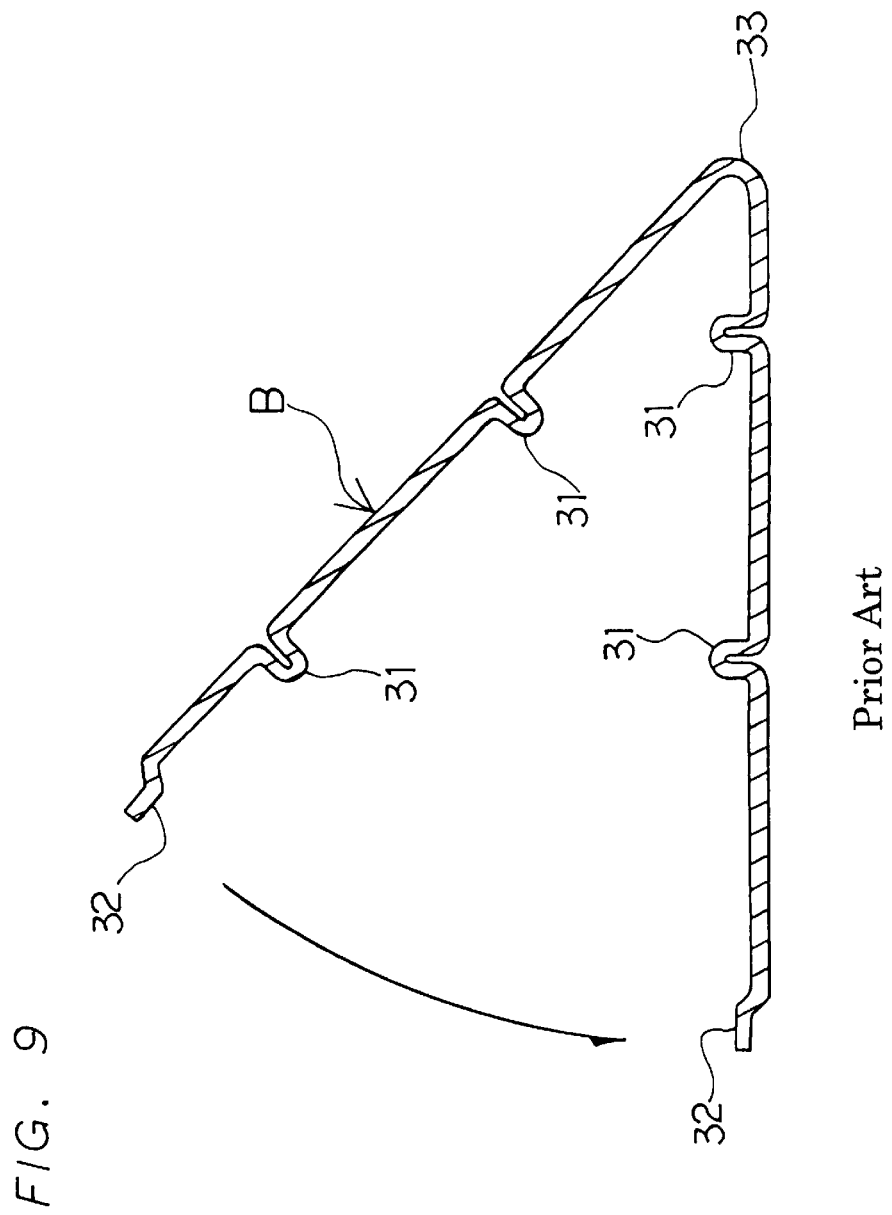
FIG. 9 is a transverse sectional view showing an example of forming a brazing sheet according to a conventional embodiment.
Figure 10:
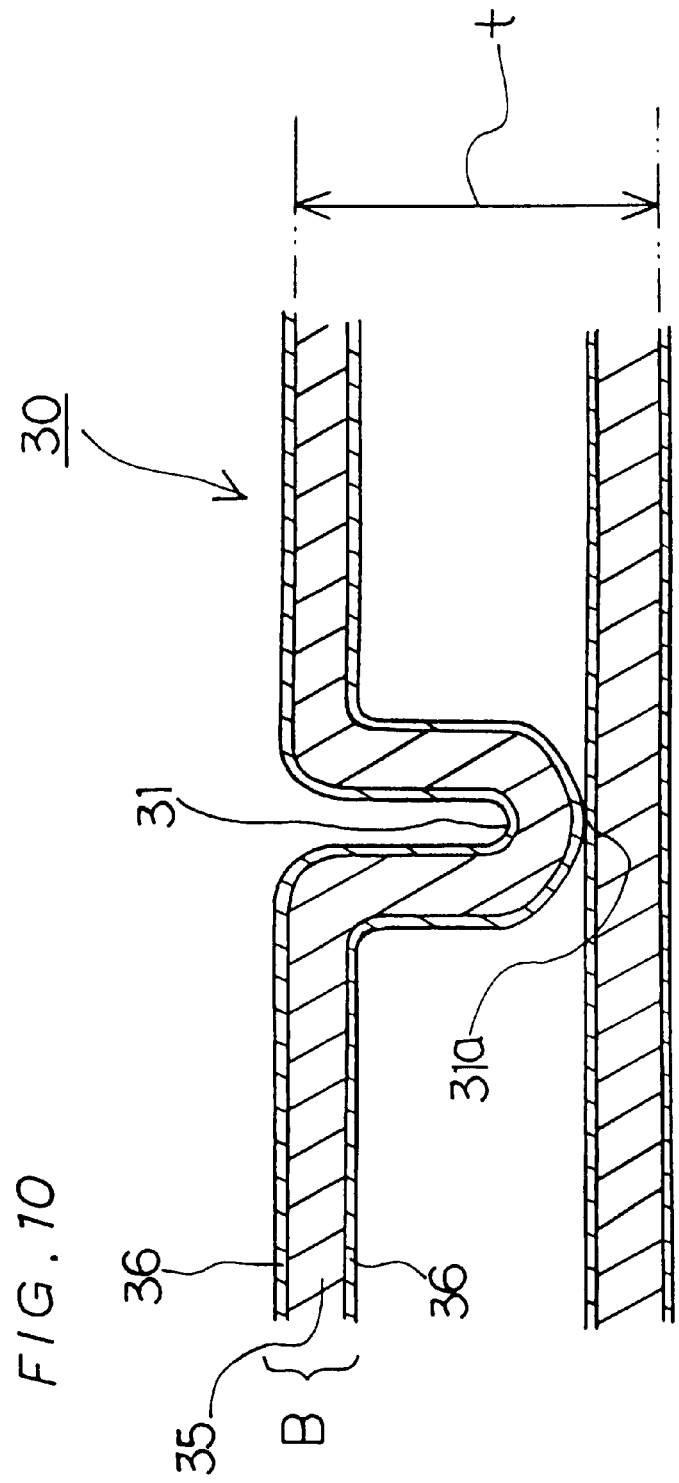
FIG. 10 is a transverse sectional view showing a required portion of a tube part prior to brazing according to the conventional embodiment.
Figure 11:
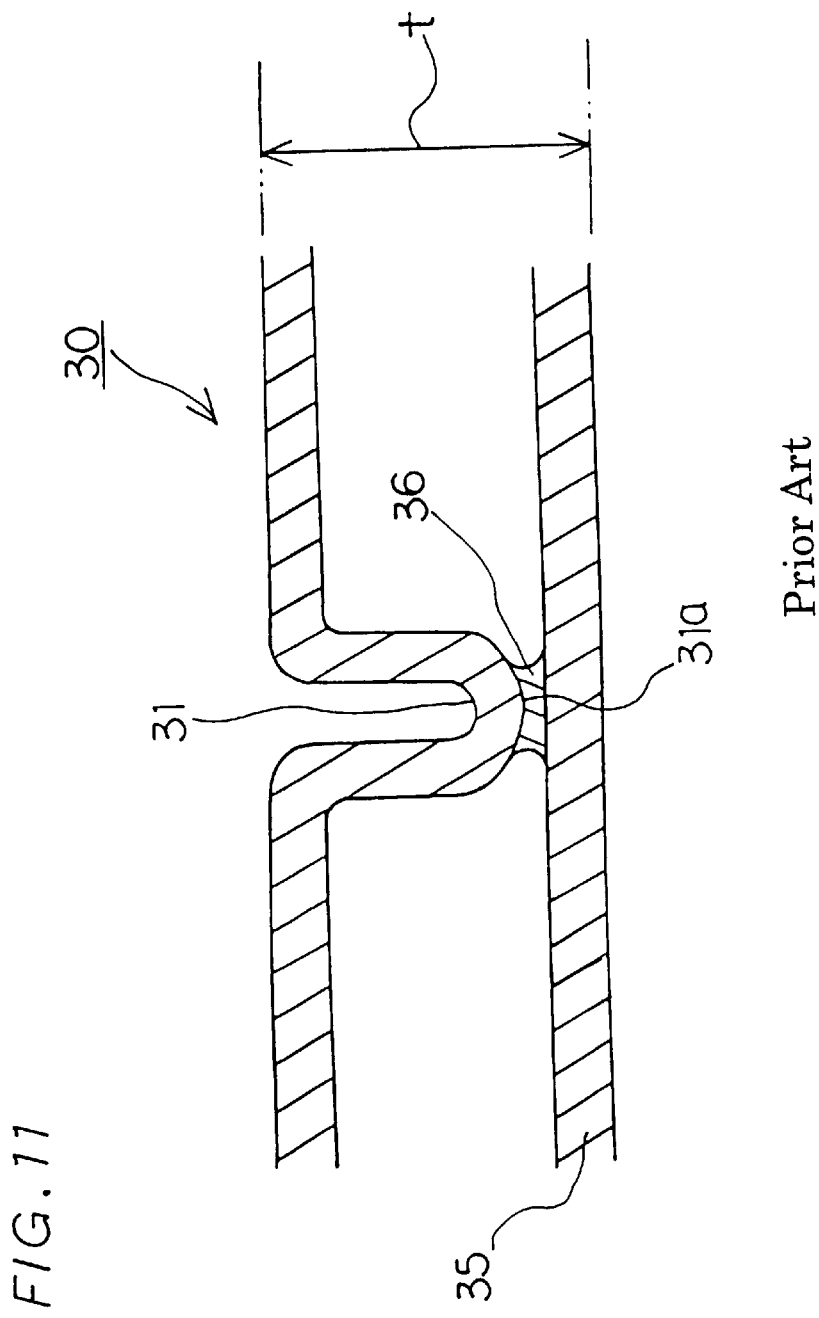
FIG. 11 is a transverse sectional view showing the required portion of the tube part after brazing according to the conventional embodiment.
Figure 12:
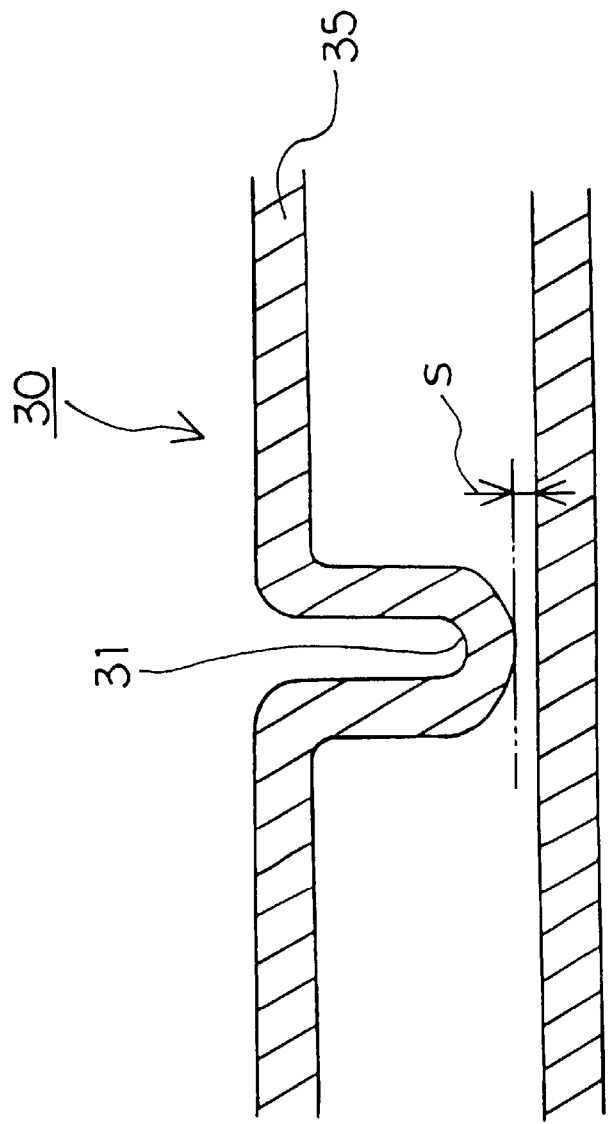
FIG. 12 is a transverse sectional view showing a matrix of a brazing sheet according to the conventional embodiment.

As shown in FIG. 8, on the portions opposed to the beads 21 may be formed an additional bead 21 so to mutually braze the tops 21a, 21a of these beads 21, 21. In this case, the tops 21a, 21a of the beads 21, 21 are also pressure contacted mutually so that they are swelled.

INDUSTRIAL APPLICABILITY

The present invention facilitates to collect the brazing material to the brazing portions to enable the improvement of the brazing property, and the brazing can be performed securely and firmly. Thus, the invention is suitable for a freezing cycle for cars which are required to have a relatively high pressure resistance.

What is claimed is:

1. A tube for a heat exchanger, comprising:

a wall formed by at least one brazing sheet and having a flat inner surface; and a plurality of beads provided in the flat inner surface of the wall, each of the beads extending continuously in a longitudinal direction of the tube and having a top brazed with a top of an opposed bead, the tops of the beads being crushed against each other such that the crushed tops successively extend in the longitudinal direction, thereby enlarging a brazed area between the tops of the beads.

* * * * *